(12) United States Patent
Casey

(10) Patent No.: US 9,460,077 B1
(45) Date of Patent: Oct. 4, 2016

(54) DATA VALIDATION

(75) Inventor: Troy Donovan Casey, Stockbridge, GA (US)

(73) Assignee: McKesson Corporation, San Francisco, CA (US)

( * ) Notice: Subject to any disclaimer, the term of this patent is extended or adjusted under 35 U.S.C. 154(b) by 430 days.

(21) Appl. No.: 13/537,522

(22) Filed: Jun. 29, 2012

(51) Int. Cl.
G06F 17/30 (2006.01)
G06F 17/27 (2006.01)

(52) U.S. Cl.
CPC .................. *G06F 17/2725* (2013.01)

(58) Field of Classification Search
None
See application file for complete search history.

(56) References Cited

U.S. PATENT DOCUMENTS

| | | | |
|---|---|---|---|
| 5,628,530 A | 5/1997 | Thornton | |
| 5,842,180 A * | 11/1998 | Khanna et al. | 705/30 |
| 6,012,035 A | 1/2000 | Freeman, Jr. et al. | |
| 6,757,898 B1 | 6/2004 | Ilsen et al. | |
| 6,769,228 B1 | 8/2004 | Mahar | |
| 7,028,288 B2 * | 4/2006 | Wall et al. | 717/109 |
| 7,127,677 B2 * | 10/2006 | Chou | 715/741 |
| 7,155,397 B2 | 12/2006 | Alexander et al. | |
| 2002/0002495 A1 | 1/2002 | Ullman | |
| 2002/0087583 A1 | 7/2002 | Morgan et al. | |
| 2002/0111832 A1 | 8/2002 | Judge | |
| 2002/0128802 A1 * | 9/2002 | Rompala | 702/188 |
| 2002/0193925 A1 * | 12/2002 | Funkhouser et al. | 701/33 |
| 2002/0198831 A1 | 12/2002 | Patricelli et al. | |
| 2003/0009367 A1 | 1/2003 | Morrison | |
| 2003/0050799 A1 | 3/2003 | Jay et al. | |
| 2003/0149625 A1 | 8/2003 | Leonardi et al. | |
| 2003/0154163 A1 | 8/2003 | Phillips et al. | |
| 2003/0229540 A1 | 12/2003 | Algiene | |
| 2004/0003335 A1 * | 1/2004 | Gertz et al. | 714/758 |
| 2004/0039599 A1 | 2/2004 | Fralic | |
| 2004/0073457 A1 | 4/2004 | Kalies | |
| 2004/0078234 A1 | 4/2004 | Tallal, Jr. | |
| 2004/0117323 A1 | 6/2004 | Mindala | |
| 2004/0148198 A1 | 7/2004 | Kalies | |
| 2004/0226002 A1 * | 11/2004 | Larcheveque et al. | 717/126 |
| 2004/0249745 A1 | 12/2004 | Baaren | |
| 2005/0015280 A1 | 1/2005 | Gabel et al. | |
| 2005/0060201 A1 | 3/2005 | Connely, III et al. | |
| 2005/0102169 A1 | 5/2005 | Wilson | |
| 2005/0154627 A1 | 7/2005 | Zuzek et al. | |
| 2005/0187793 A1 | 8/2005 | Myles | |
| 2005/0197862 A1 | 9/2005 | Paterson et al. | |

(Continued)

FOREIGN PATENT DOCUMENTS

| | | |
|---|---|---|
| CA | 2482370 | 3/2006 |
| WO | 9503569 | 2/1995 |

(Continued)

OTHER PUBLICATIONS

Actron CP9580A Auto Scanner Plus manual, SPX Corporation, 2010.*

(Continued)

*Primary Examiner* — Richard Bowen
(74) *Attorney, Agent, or Firm* — Sutherland Asbill & Brennan LLP

(57) ABSTRACT

Systems, methods, apparatuses, and computer readable media are disclosed for receiving a validation request from a requestor, executing one or more validation routines for at least a portion of data included in the validation request, generating a validation response based on the execution of the one or more validation routines, and communicating the validation response to the requestor.

19 Claims, 4 Drawing Sheets

(56) References Cited

U.S. PATENT DOCUMENTS

| | | |
|---|---|---|
| 2005/0240473 A1 | 10/2005 | Ayers, Jr. et al. |
| 2005/0288972 A1 | 12/2005 | Marvin et al. |
| 2006/0005169 A1* | 1/2006 | Berstis et al. ............... 717/125 |
| 2006/0020514 A1 | 1/2006 | Yered |
| 2006/0026041 A1 | 2/2006 | Ullman |
| 2006/0085761 A1* | 4/2006 | Allen et al. .................. 715/780 |
| 2006/0149784 A1 | 7/2006 | Tholl et al. |
| 2006/0184391 A1 | 8/2006 | Barre et al. |
| 2006/0259363 A1 | 11/2006 | Jhetam |
| 2007/0005402 A1 | 1/2007 | Kennedy et al. |
| 2007/0050209 A1 | 3/2007 | Yered |
| 2007/0136100 A1 | 6/2007 | Daugherty et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2008/0144881 A1* | 6/2008 | Fortune et al. ............... 382/100 |
| 2008/0263398 A1* | 10/2008 | Mori et al. ..................... 714/25 |
| 2008/0313120 A1* | 12/2008 | Kumbi et al. .................. 706/47 |
| 2009/0006282 A1* | 1/2009 | Roth et al. ..................... 706/12 |
| 2009/0006283 A1* | 1/2009 | Labrie et al. .................. 706/12 |
| 2009/0307537 A1* | 12/2009 | Chen et al. .................... 714/54 |
| 2010/0050154 A1* | 2/2010 | Balasubramanian ......... 717/113 |
| 2010/0131837 A1* | 5/2010 | Lindal et al. ................. 715/234 |
| 2010/0223071 A1 | 9/2010 | Kland et al. |
| 2010/0278119 A1* | 11/2010 | Potkonjak .................... 370/329 |
| 2011/0119220 A1* | 5/2011 | Seolas et al. .................. 706/47 |
| 2013/0007700 A1* | 1/2013 | Villar et al. .................. 717/109 |
| 2013/0073531 A1* | 3/2013 | Robinson et al. ............ 707/694 |
| 2013/0080188 A1 | 3/2013 | Rosenfeld |

FOREIGN PATENT DOCUMENTS

| | | |
|---|---|---|
| WO | 0039737 | 7/2000 |
| WO | 2007025295 | 3/2007 |

OTHER PUBLICATIONS

Sampson, R.J., Taking Control of Health Care Costs, Best's Review—Life Health Insurance Edition, Nov. 1983, pp. 64-66, vol. 84, Issue 7, USA.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, pp. 128-132. vol. 63, Issue 1, USA.

Anonymous, TechRx Announces Successful Beta Deployment of T-Rex. PR Newswire. May 13, 2002.

Non-final Office Action for U.S. Appl. No. 13/833,829 mailed Feb. 2, 2015.

Final Office Action for U.S. Appl. No. 13/833,829 mailed Aug. 24, 2015.

* cited by examiner

DATA VALIDATION

TECHNICAL FIELD

This disclosure relates generally to data validation and data sanitization, and more particularly, to network-based data validation and data sanitization.

BACKGROUND

Data validation generally refers to a process for ensuring that a computer program operates on sanitized, accurate, and meaningful data. Data validation techniques generally employ routines (also known as "validation rules" or "check routines") that perform checks on input data to ensure its accuracy and meaningfulness.

Data validation is a critical component of information security generally and is particularly relevant to the field of network security. Various applications such as web applications, for example, provide functionality for accepting and processing user input data. Web forms may be provided as part of a web application and have become a common mechanism for submitting and receiving input data via public or private networks. Various forms of malicious attack such as cross-site scripting (XSS) and Structured Query Language (SQL) injection attacks, for example, take advantage of a web application's laxity in checking the input values that are passed to the web application.

XSS refers to a vulnerability typically found in web applications that allows attackers to bypass client-side security mechanisms normally imposed on web content by web browsers and inject malicious scripts into web pages that allow the attacker to gain elevated-access privileges to sensitive page content, session cookies, and a variety of other information. SQL injection is a form of malicious attack often used to attack a database through a website, and involves including portions of SQL statements in a web form entry field to cause the website to pass a rogue SQL command to the database to produce malicious effects (e.g., modifying or erasing database contents, dumping database contents to the attacker, etc.).

If mechanisms for validating and sanitizing input data are not in place, these types of malicious data attacks may have a devastating impact on the security of data and the systems that store and operate on that data. However, although data validation is critical to ensuring the accuracy of data and for protecting against malicious data attacks, it is often inconsistently built into web applications. Moreover, even if data validation logic is directly coded into applications, new patterns of attack require individual updates to each application's code, a cumbersome and time consuming process prone to error.

Scripting languages that operate on a web user's device allow for the dynamic creation and modification of a web page within a web browser running on the user's device, and may, on occasion, perform limited pre-validation of web form data. However, data validation performed by client-side scripting languages suffers from the same drawbacks associated with built-in web application validation logic, that is, inconsistent use and the need to individually update code on each user's device to protect against new patterns of attack.

Application Firewalls (AFs) are firewalls that control input, output, and/or access from, to, or by an application or service. Network-based application layer firewalls are computer networking firewalls that operate at the application layer. While some network-based firewalls may be capable of performing input data validation, such firewalls are not integrated into client applications and must be individually configured for each application for which they provide data validation and sanitization services. As such, network-based application layer firewalls do not address the disadvantages noted above with respect to other data validation mechanisms.

SUMMARY

One or more embodiments of the disclosure relate to systems, methods, apparatuses, and computer readable media for receiving a validation request from a requestor, executing one or more validation routines on at least a portion of data included in the validation request, generating a validation response based on the execution of the one or more validation routines, and communicating the validation response to the requestor.

In an embodiment of the disclosure, a method comprises: receiving, by a data validation system comprising one or more computers, a validation request from a requestor, wherein the validation request comprises a data set, and wherein the data set comprises one or more asserted data types and one or more data strings; executing, by the data validation system, one or more validation routines to determine a validity of each data string based at least in part on at least one corresponding asserted data type of the one or more asserted data types; generating, by the data validation system, a validation response based on the execution of the one or more validation routines; and communicating, by the data validation system, the validation response to the requestor.

In another embodiment of the disclosure, a data validation system comprises: one or more computers, each computer comprising one or more processors and at least one memory operatively coupled to the one or more processors; and a validation module stored in the at least one memory of at least one of the one or more computers. The validation module comprises one or more computer-executable instructions that upon execution by at least one processor of the one or more processors configures the at least one processor to: receive a validation request from a requestor, wherein the validation request comprises a data set, and wherein the data set comprises one or more asserted data types and one or more data strings; execute one or more validation routines to determine a validity of each data string based at least in part on at least one corresponding asserted data type of the one or more asserted data types; generate a validation response based on the execution of the one or more validation routines; and communicate the validation response to the requestor.

In another embodiment of the disclosure, a computer-readable medium comprises computer-executable instructions that upon execution by one or more computer processors causes a method to be performed. The method comprises: receiving a validation request from a requestor, wherein the validation request comprises a data set, and wherein the data set comprises one or more asserted data types and one or more data strings; executing one or more validation routines to determine a validity of each data string based at least in part on at least one corresponding asserted data type of the one or more data types; generating a validation response based on the execution of the one or more validation routines; and communicating the validation response to the requestor.

These and other embodiments of the disclosure are described in more detail in the detailed description that follows.

BRIEF DESCRIPTION OF THE FIGURES

Throughout the detailed description that follows, reference will be made to the accompanying drawings, which form part of this disclosure. The accompanying drawings are not necessarily drawn to scale. Throughout this disclosure plural terminology includes the singular and vice versa. A brief description of each drawing follows.

DETAILED DESCRIPTION OF EMBODIMENTS OF THE DISCLOSURE

Figure 1A:
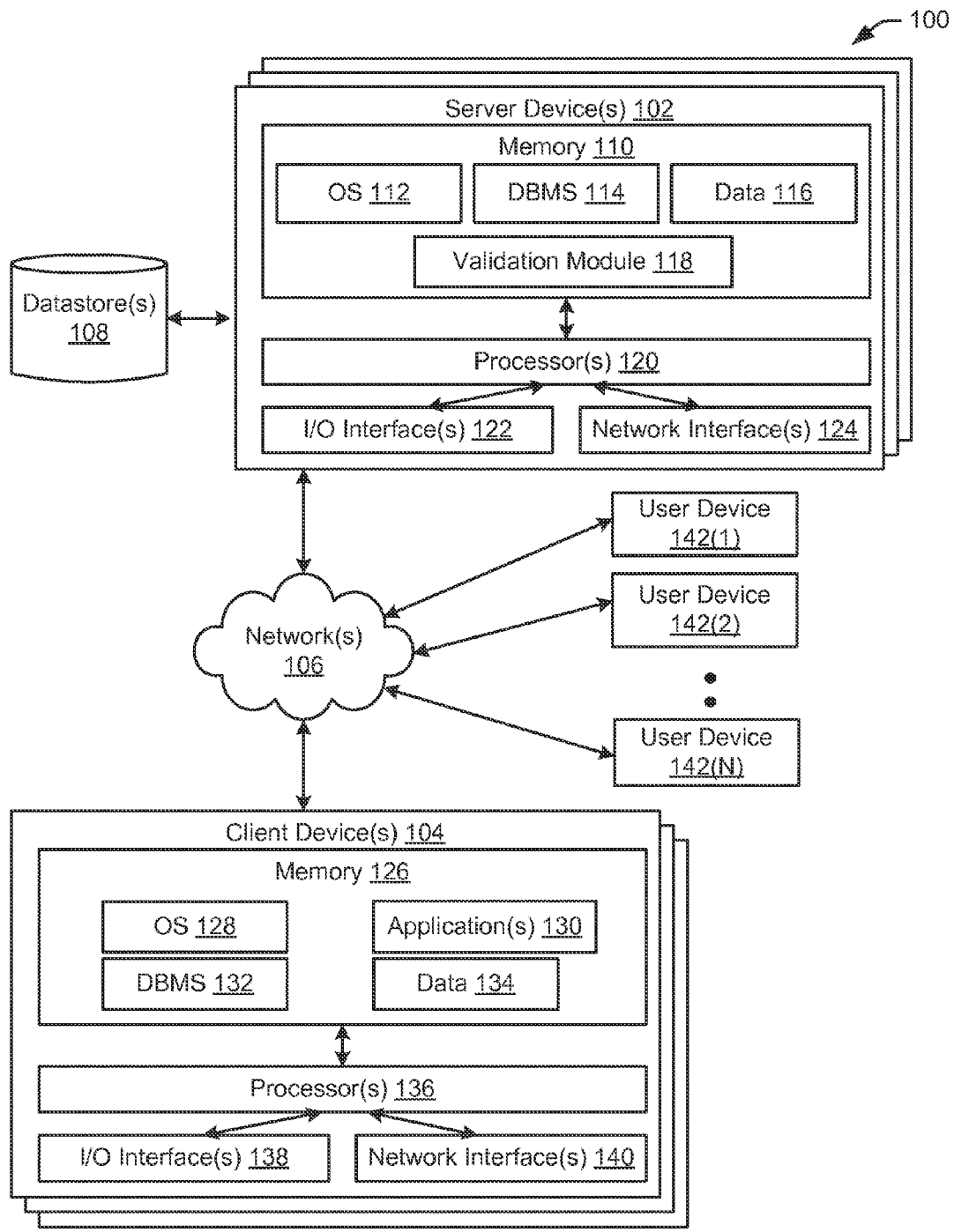
FIG. 1A is a schematic representation of a network-based interaction using a data validation system in accordance with one or more embodiments of the disclosure.

Embodiments of the disclosure relate to systems, methods, apparatuses, and computer-readable media for performing data validation. One or more specific embodiments of the disclosure relate to systems, methods, apparatuses, and computer-readable media for receiving a validation request from a requestor, executing one or more validation routines on at least a portion of data included in the validation request, generating a validation response based on the execution of the one or more validation routines, and communicating the validation response to the requestor.

Embodiments of the disclosure are described more fully hereinafter through reference to the accompanying drawings, in which certain embodiments of the disclosure are shown. This disclosure may, however, be embodied in many different forms and should not be construed as limited to the embodiments set forth herein; rather, these embodiments are provided so that the scope of the disclosure is conveyed to those skilled in the art. Like numbers refer to like elements throughout.

Example embodiments of the disclosure will now be described with reference to the accompanying figures.

Referring to FIG. 1, one or more server devices 102, one or more client devices 104, and one or more user devices 142(1)-142(N) may be provided. The server device(s) 102, the client device(s) 104, and the user device(s) 142(1)-142(N) may be configured to communicate via one or more networks 106. The network(s) 106 may be any combination of one or more public or private wired and/or wireless networks including, but not limited to, the World Wide Web (WWW), the Internet, an intranet, an internet, a wide area network (WAN), a metropolitan area network (MAN), a local area network (LAN), a personal area network (PAN), a mesh network, a cellular wireless network including wireless 3G networks or wireless 4G networks, and so forth.

Each server device 102 may include one or more processors 120 and at least one memory 110 operatively coupled to the one or more processors 120. Each server device 102 may be any device capable of providing services to a requesting device (e.g., client device(s) 104) through the network(s) 106. As a non-limiting example, at least one server device 102 may be a web server capable of providing, at least in part, one or more services over the network(s) 106 to the client device(s) 104, for example. An operating system (OS) 112, a database management system (DBMS) 114, data 116 (which may be any data capable of being accessed and/or manipulated by the one or more processors 120), and a validation module 118 may be loaded, among other components, into the at least one memory 110. Each server device 102 may further comprise one or more input/output (I/O) interfaces 122 and one or more network interface(s) 124. It should be noted that the foregoing is not an exhaustive list of components of each server device 102 and that one or more of the server device(s) 102 may comprise any number of additional hardware and/or software components. Further, in one or more embodiments, certain components depicted in FIG. 1 as being part of the server device(s) may not be present.

The server device(s) 102 may form at least part of a data validation system in accordance with one or more embodiments of the disclosure. As will be described in more detail hereinafter, the server device(s) 102 may receive one or more validation requests via the network(s) 106 from the client device(s) 104, for example. The server device(s) 102 may be configured to execute one or more validation routines on at least a portion of data included in each of the validation request(s) in order to generate validation response(s), which may, in turn, be communicated to the requesting client device(s) via the network(s) 106. The server device(s) 102 may access and retrieve data from one or more datastores 108 as part of the execution of the validation routine(s). The datastore(s) 108 may also form at least part of a data validation system according to one or more embodiments of the disclosure and may include, without limitation, any data repository such as database(s) organized according to any database model, operational datastore(s), schema-less datastore(s), paper files, data files (e.g., spread sheets, flat files, etc.), and so forth.

Each client device 104 may comprise one or more processors 136 and at least one memory 126 operatively coupled to the one or more processors 136. An operating system (OS) 128, a database management system (DBMS) 132, data 134 (which may be any data capable of being manipulated by the one or more processors 136), and one or more applications 130 may be loaded or stored, among other components, in the at least one memory 126. Each client device 104 may further comprise one or more I/O interfaces 138 and one or more network interfaces 140. It should be noted that the foregoing is not an exhaustive list of components of each client device 104 and that one or more of the client devices 104 may comprise any number of additional hardware and/or software components. Further, in certain embodiments, one or more of the components depicted in FIG. 1 as being part of the client device(s) 104 may not be present. For example, the client device(s) 104 may not include a DBMS 132 in certain embodiments.

The terms "client device" and "server device" may be used in the context of this disclosure to convey that the server device(s) 102 provide services requested by the client device(s) 104. However, in accordance with one or more embodiments of the disclosure, the client device(s) 104 may request and perform services for other client device(s) 104, and thus any particular client device 104 may at times take on server-related functionality with respect to other client device(s) 104. Similarly, the server device(s) 102 may request and perform services for other server device(s) 102, and thus any particular server device 102 may at times take on client-related functionality.

The one or more processors 120 and/or the one or more processors 136 may include, without limitation, a central processing unit (CPU), an integrated circuit, an Application Specific Integrated Circuit (ASIC), a reduced instruction set computer (RISC), a complex instruction set computer (CISC), a microprocessor, a microcontroller, a field programmable gate array (FPGA), or any combination thereof.

The at least one memory 110 and/or the at least one memory 126 may comprise one or more volatile and/or non-volatile memory devices including, but not limited to, magnetic storage devices, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), magnetoresistive random access memory (MRAM), universal serial bus (USB) removable memory, or combinations thereof. The at least one memory 110 and/or the at least one memory 126 may further include any form of memory technology for storing information that may be developed in the future.

The OS 112 and/or the OS 128 may be any operating system presently known in the art or which may be developed in the future including, but not limited to, a Microsoft Windows® operating system, an Apple OSX™ operating system, Linux, Unix, a mainframe operating system such as Z/OS, or a mobile operating system including, but not limited to, any version of Apple® iOS, any Android®-based operating system, any version of the Palm® webOS operating system, any version of the Windows® Mobile operating system, any version of the Windows® Phone operating system, any version of Blackberry® OS, any version of Windows® operating system, any version of Nokia®'s Symbian operating system, any version of Nokia®'s Maemo operating system, any version of MeeGo (a Linux®-based operating system), or any version of Samsung®'s bada operating system.

The DBMS 114 and/or the DBMS 132 may be any database or datastore management system known in the art or which may be developed in the future for creating, maintaining, and using databases and/or datastores. The DBMS 114 and/or the DBMS 132 may use any database model including, but not limited to, a hierarchical model, a network model, a relational model, a multidimensional model, or an object-oriented model, and may support any query languages now known in the art or which may be developed in the future.

The one or more user devices 142(1)-142(N) may include any general purpose computing device including, but not limited to, a personal desktop computer, a workstation, a laptop, a netbook, an ultrabook, a tablet personal computer (PC), a tablet device, a smartphone device, or any other desktop or mobile wireless device now known in the art or which may be developed in the future. The one or more user devices 142(1)-142(N) may comprise any number of hardware and/or software components including any of the components described above with respect to the server device(s) 102 and/or the client device(s) 104.

The one or more applications 130 loaded or stored, at least in part, in the at least one memory 126 of a client device 104 may include, for example, one or more web-based applications. As used herein, a "web-based application" may refer generally to an application that is accessed over a network, or more specifically, to an application that may be coded in a browser-supported language and/or a browser-rendered language, and which may require a web browser or other program to render the application executable.

The web-based application(s) 130 may include web page(s) that include web form(s) that comprise one or more data fields for inputting data. The user device(s) 142(1)-142(N) may be configured to run one or more web browser applications for loading, viewing, and manipulating web page(s) which form at least part of the web-based application(s) 130. More specifically, a client device 104 may transmit one or more web pages of a web-based application 130 via network(s) 106 to at least one of the user devices 142(1)-142(N). A web browser running on the at least one user device may be configured to process and render the web page(s) of the web-based application 130. In one or more embodiments of the disclosure, at least one of the user devices 142(1)-142(N) may be a mobile device such as a smartphone or tablet device. The mobile device may include applications that are capable of accepting input data from a user of the device. As used herein, the term "web form" may encompass mobile device applications capable of accepting input data.

While embodiments of the disclosure may be described herein in the context of validation of data that is inputted to web form(s) provided on one or more web pages of a web-based application, the disclosure is not limited to these scenarios. Embodiments of the disclosure encompass network-based validation of any input data regardless of the mechanism by which the data is received. As such, while the application(s) may in certain embodiments represent web application(s), and the client device(s) 104 and/or server device(s) 102 may in certain embodiments represent web server(s), embodiments of the disclosure include any type of server device 102 and client device 104 and any type of application 130 that provides functionality for accepting input data.

In accordance with one or more embodiments of the disclosure, each of the data field(s) provided in a web form may have one or more data types associated therewith that specify type(s) of input accepted for that field. Exemplary data types include, but are not limited to, a floating point data type, an integer data type, a Boolean data type, an alphanumeric character, an American Standard Code for Information Interchange (ASCII) character, a character string (e.g., a sequence of alphanumeric characters, a sequence of ASCII characters, etc.), enumerated types, derived data types such as, for example, lists, arrays, trees, and so forth, or any combinations thereof. Exemplary data types further include, but are not limited to, data types supported in Hypertext Markup Language (HTML) forms, other defined data types such as a telephone number, street address, a Vehicle Identification Number (VIN), an automobile make and model, a quantity of currency (e.g., a price of a purchase item), or any other datum description with clearly defined bounds that permits a determination as to whether a particular datum belongs to a set defined by that datum description.

The data type(s) associated with a particular data field in a web form may dictate type(s) of input accepted for that field. As a non-limiting example, acceptable inputs for an address field may include an alphanumeric character string or a string of ASCII characters with the exception of certain prohibited characters (e.g., !, :,}, *, and so forth). As another non-limiting example, an acceptable input for a telephone number data field may include a string of characters of a predetermined length. More specifically, character strings of a predetermined length that include only integers may be accepted, while in other embodiments, certain additional ASCII character(s) (e.g., the ASCII character 5F representing a '-') may be accepted as well. In still other embodiments, a particular data type may define a permissible sequence of characters in addition to a permissible character set. For example, a data type definition for a telephone number may, in addition to defining a set of permissible character inputs, also specify a permissible sequence of characters (e.g., only specific sequences of characters may be accepted for the area code portion of the number).

Figure 1B:
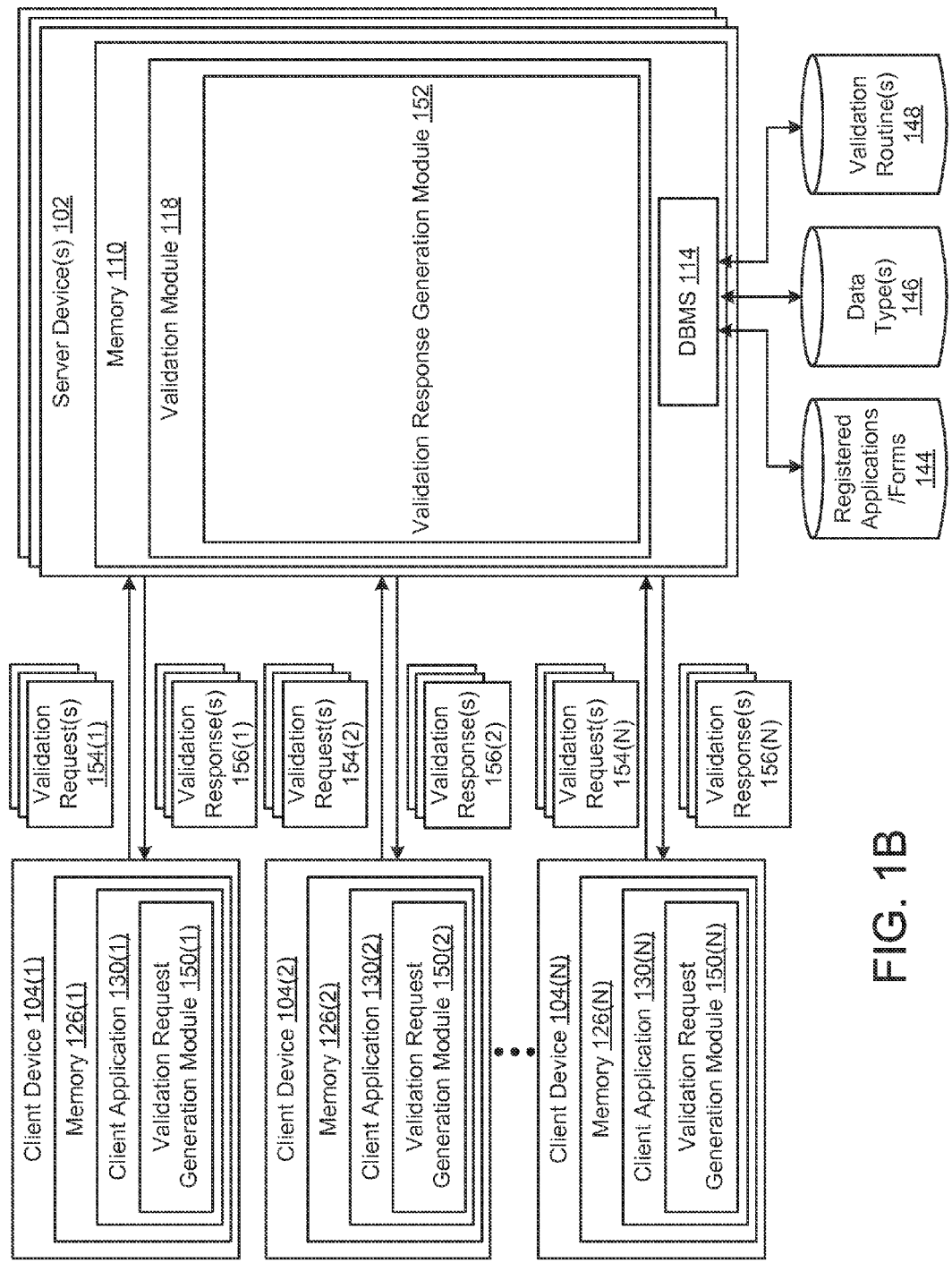
FIG. 1B is another schematic representation of the network-based interaction depicted in FIG. 1A.

FIG. 1B depicts a network-based interaction according to one or more exemplary embodiments of the disclosure. As previously described through reference to FIG. 1A, the server device(s) 102 may each comprise the at least one memory 110 and the DBMS 114. The DBMS 114 may be configured to access, retrieve, store, or manage data stored in various datastores, which may include a registered applications/forms datastore 144, a data type(s) datastore 146, and a validation routine(s) datastore 148. One or more additional datastores beyond those depicted in FIG. 1B may be provided in various embodiments of the disclosure. For example, each of the datastores 144, 146, 148 may, according to one or more embodiments, correspond to a set of multiple datastores. Further, one or more of the datastores 144, 146 and 148 may be consolidated into fewer datastore(s) in various embodiments of the disclosure. The datastores 144, 146, 148 may be logically or physically partitioned.

The server device(s) 102 may each further comprise the validation module 118, which, in turn, may comprise a validation response generation module 152. Other components of the server device(s) 102 are not shown in FIG. 1B for the sake of simplicity. If multiple server devices 102 are provided, the validation module 118 of each server device 102 may independently execute one or more validation routines on data included in separate validation requests. In alternative embodiments of the disclosure, the validation modules 118 of multiple server devices 102 may each execute one or more validation routines on portions of data included in a same validation request.

Client devices 104(1)-104(N) may each correspond to the client device 104 depicted in FIG. 1A. The client devices 104(1)-104(N) may comprise memories 126(1)-126(N), respectively. Client applications 130(1)-130(N) may be loaded or stored, at least in part, in the memories 126(1)-126(N), respectively. The client applications 130(1)-130(N) and the memories 126(1)-126(N) may each correspond to the client application 130 and the at least one memory 126, respectively. The client applications 130(1)-130(N) may comprise validation request generation modules 150(1)-150(N), respectively. Each of the validation request generation modules 150(1)-150(N) may be capable of generating one or more respective corresponding validation requests 154(1)-154(N). Although the client applications 130(1)-130(N) are depicted in FIG. 1B as being associated with a respective corresponding client devices 104(1)-104(N), it should be noted that in various embodiments of the disclosure, one or more of the client applications 130(1)-130(N) may be distributed applications such that more than one of the client devices 104(1)-104(N) are configured to execute portions of the distributed client applications. In those embodiments of the disclosure in which one or more of the client applications 130(1)-130(N) are distributed applications, the respective corresponding validation request generation modules 150(1)-150(N) may similarly be distributed across more than one of the client devices 104(1)-104(N).

According to one or more embodiments of the disclosure, the validation module(s) 118 and/or the validation response generation module(s) 152 of the server device(s) 102 may comprise computer-executable instructions capable of being executed by the one or more processors 120 to perform one or more validation routines and to generate one or more validation responses based on the execution of the validation routine(s), respectively. More specifically, the server device(s) 102 may be configured to access and retrieve validation routine(s) stored in the validation routine(s) datastore 148 using the DBMS 114. The one or more processors 120 may be configured to execute the validation routine(s) using the validation module 118.

While the validation response generation module 152 is depicted as a sub-module of the validation module 118, in one or more alternative embodiments, the validation response generation module 152 may be provided independently of the validation module 118. Similarly, while the validation request generation modules 150(1)-150(N) are depicted as sub-modules of the respective corresponding client applications 130(1)-130(N), in one or more alternative embodiments of the disclosure, the validation request generation modules 150(1)-150(N) may be provided as part of the respective corresponding client devices 102(1)-102(N) independently of the client applications 130(1)-130(N) (e.g., within respective corresponding memories 126(1)-126(N) but independently of client applications 130(1)-130(N)). Further, in one or more embodiments of the disclosure, the validation response generation module 152 may not be present as a separate module or sub-module of the validation module 118, and functionality described as being provided by the validation response generation module 152 may be provided by the validation module 118 generally. Similarly, in one or more embodiments of the disclosure, the validation request generation modules 150(1)-150(N) may not be present as separate modules of the client applications 130(1)-130(N), and functionality described as being provided by the validation request generation modules 150(1)-150(N) may be provided by the client applications 130(1)-130(N) generally.

Any of the validation request(s) 154(1)-154(N) may be an Extensible Markup Language (XML) formatted transaction. In other embodiments of the disclosure, the validation request(s) 154(1)-154(N) may be formatted using any appropriate markup language now known in the art or which may be developed in the future including, but not limited to, eXtensible HyperText Markup Language (XHTML), Hypertext Markup Language (HTML), Scribe, Standard Generalized Markup Language (SGML), or the like. In still further embodiments, the validation request(s) 154(1)-154(N) may be generated and formatted using various forms of data encoding.

In one or more embodiments of the disclosure, the server device(s) 102 and/or the datastores 144, 146, 148 may form at least part of a web service for executing validation routine(s) on data included in the validation request(s) 154(1)-154(N) received from the client device(s) 104(1)-104(N) and for generating validation response(s) 156(1)-156(N) thereto which may be communicated to the requesting client device(s) 104(1)-104(N). The server device(s) 102 may be exposed to the client device(s) 104(1)-104(N), or more particularly the client application(s) 130(1)-130(N) running on the client device(s) 104(1)-104(N), via standard interfaces including, but not limited to, Simple Object Access Protocol (SOAP), Representational state transfer (REST) architectures, and so forth. The validation request(s) 154(1)-154(N) may be encrypted to prevent unauthorized capture and manipulation of data included therein, and capabilities of the client device(s) 104(1)-104(N) and/or the server device(s) 102 may be leveraged to provide the encryption functionality. As a non-limiting example, the validation request(s) 154(1)-154(N) may be transmitted from the client device(s) 104(1)-104(N) to the server device(s) 102 using Hypertext Transfer Protocol Secure (HTTPS), which is a combination of HTTP and Secure Sockets Layer (SSL) or Transport Layer Security (TLS) protocols, and which provides for encrypted communication between networked components.

The validation services provided by the server device(s) 102 in connection with the datastore(s) 108 (e.g., datastores 144, 146, 148) may be implemented, for example, using any network-based technology and may be based on any delivery model employing such technologies including, but not limited to, a shared service for a variety of application(s), a site-based or subscription-based service to support deployment of such application(s), a private or public cloud-based service, a back-end Software as a service (SaaS) delivery model, or the like.

Figure 3:
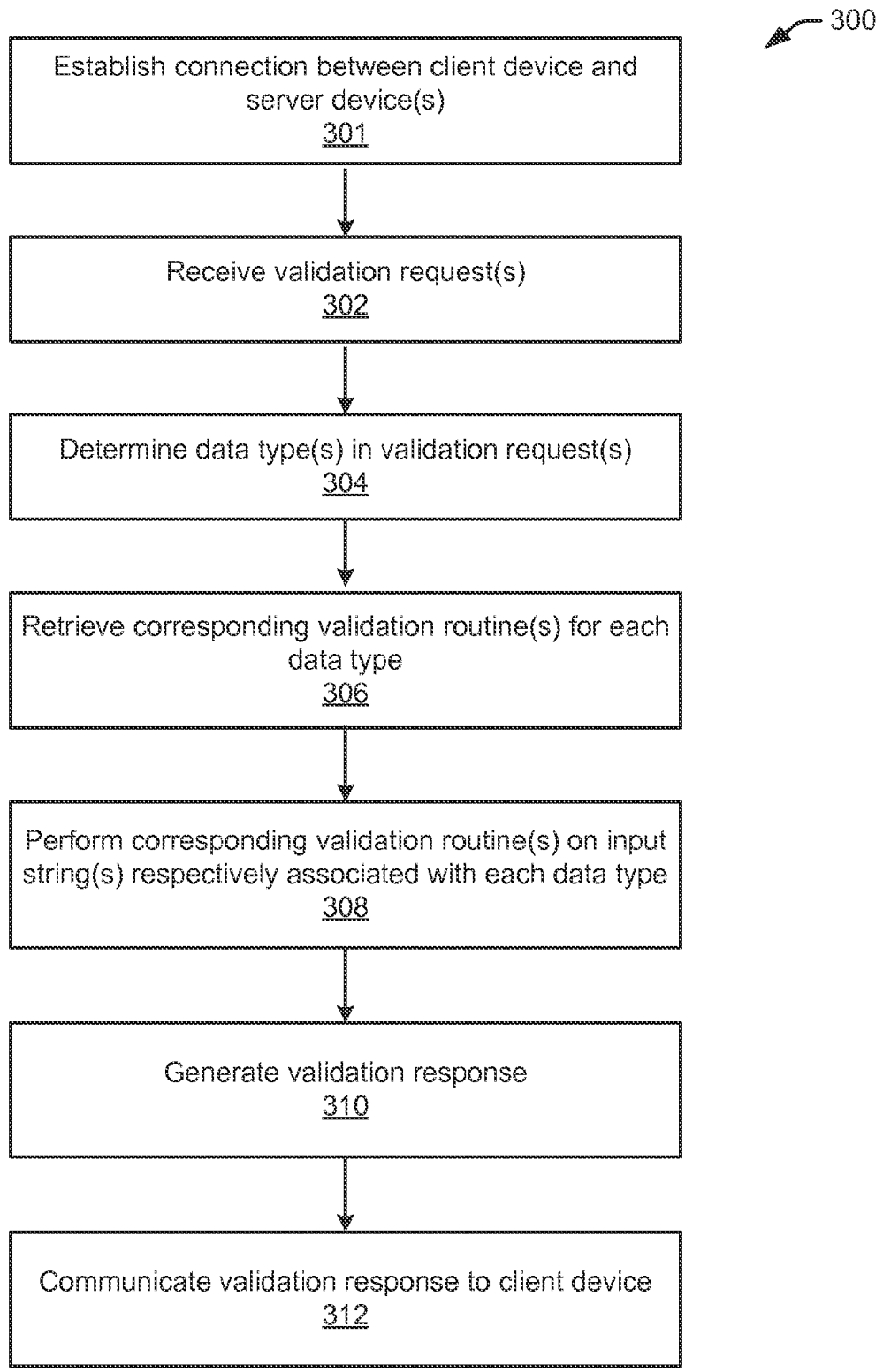
FIG. 3 is a flow diagram illustrating a method for performing data validation in accordance with one or more embodiments of the disclosure.

FIG. 3 depicts a process flow for a data validation process 300 that may be performed by one or more components depicted in FIGS. 1A and 1B. An interaction between the client device 104(1) and the server device(s) 102 will be used to illustrate an exemplary embodiment of the disclosure. However, it should be understood that according to one or more embodiments of the disclosure, each of the client devices 104(1)-104(N), or more specifically, each of the client applications 130(1)-130(N) running on the client devices 104(1)-104(N) may be capable of respectively generating the validation requests 154(1)-154(N) and forwarding the validation requests 154(1)-154(N) to the server device(s) 102. The server device(s) 102 may be configured to execute one or more validation routines on data included in the validation requests 154(1)-154(N), generate respective validation responses 156(1)-156(N), and forward the validation responses 156(1)-156(N) to the appropriate client devices 104(1)-104(N).

Referring to FIG. 3, at block 301, a connection may be established between the client device 104(1) and the server device(s) 102 via the network(s) 106. The client device 104(1) may initiate the connection with the server device(s) 102 if the client device 104(1) requires data validation services provided by the server device(s) 102. Upon establishment of the connection between the client device 104(1) and the server device(s) 102, the client device 104(1) may be configured to transmit and the server device(s) 102 configured to receive, via the network(s) 106, one or more validation requests 154(1).

The connection established between the client device 104(1) and the server device(s) 102 may take on any of a variety of operational modes including, but not limited to, a transaction-based mode according to which the client device 104(1) or a particular client application 130(1) running on the client device 104(1) establishes a new connection with the server device(s) 102 prior to transmitting each validation request 154(1), or a continuously-connected mode according to which the client device 104(1) submits multiple validation requests 154(1) to the server device(s) 102 over an established and continuously maintained connection.

Figure 2:
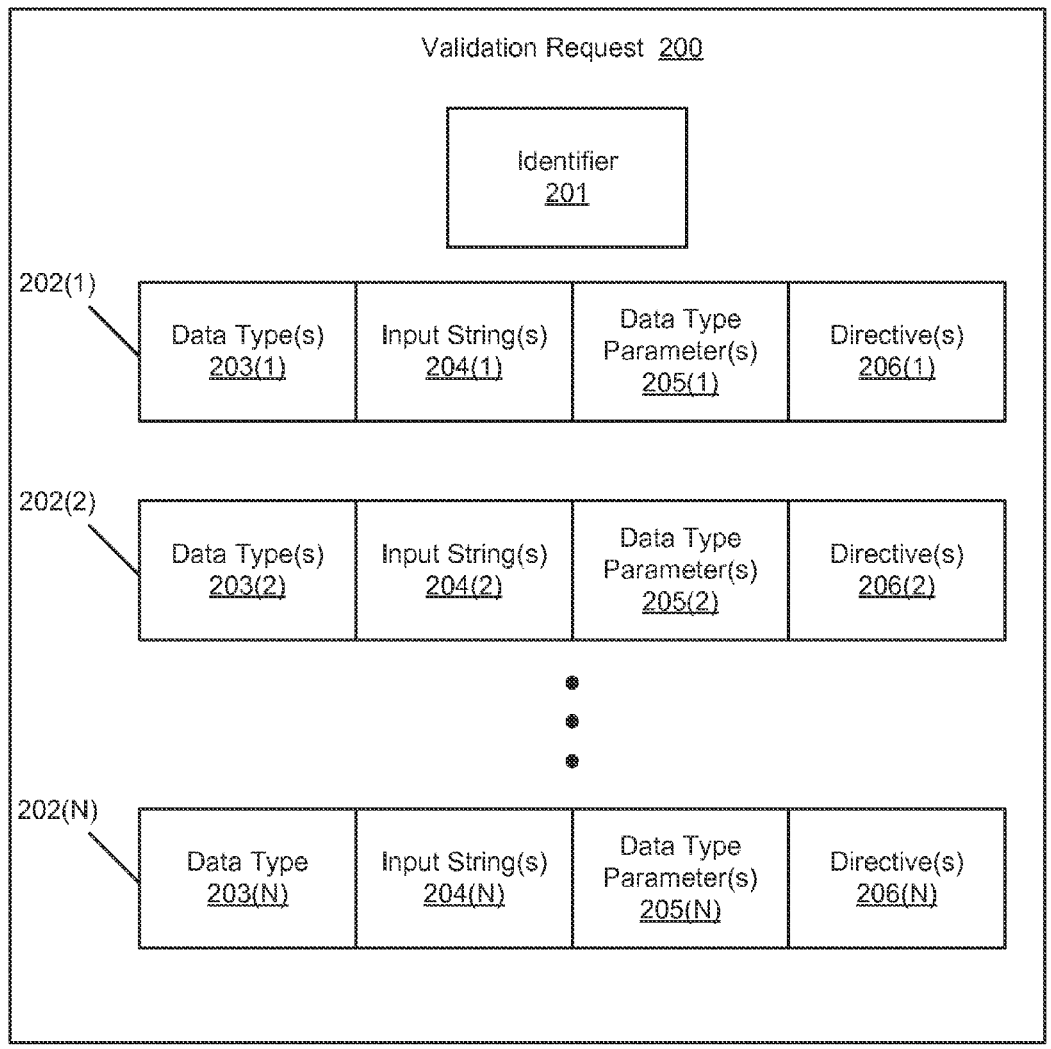
FIG. 2 is a schematic representation of a validation request in accordance with one or more embodiments of the disclosure.

A representative validation request 200 according to one or more embodiments of the disclosure is depicted in FIG. 2. Any of the validation requests 154(1)-154(N) may correspond to the validation request 200. The validation request 200 may comprise one or more data sets 202(1)-202(N). The following description is presented through reference to the data set 202(1); however, the description is equally applicable to any of the data sets 202(1)-202(N).

The data set 202(1) may comprise one or more data types 203(1), one or more input strings 204(1), one or more data type parameters 205(1), and/or one or more validation directives 206(1). The one or more data types 203(1) may be any data type(s) including, but not limited to, a floating point data type, an integer data type, a Boolean data type, an alphanumeric character, an American Standard Code for Information Interchange (ASCII) character, a character string (e.g., a sequence of alphanumeric characters, a sequence of ASCII characters, etc.), enumerated types, derived data types such as, for example, lists, arrays, trees, and so forth, or any combinations thereof. The one or more data type(s) 203(1) may further include, but are not limited to, data types supported in Hypertext Markup Language (HTML) forms, other defined data types such as a telephone number, street address, a Vehicle Identification Number (VIN), an automobile make and model, a quantity of currency (e.g., a price of a purchase item), or any other datum description with clearly defined bounds that permits a determination as to whether a particular datum belongs to a set defined by that datum description.

The one or more input strings 204(1) may comprise any sequence of one or more characters. The one or more input strings 204(1) may be provided as input by a user of a user device (e.g., any of the user devices 142(1)-142(N)) to one or more fields in a web form that forms part of the client application 130(1), which may be a web application. However, embodiments of the disclosure are not limited to data input to web forms of web applications, and the input string(s) 204(1) may be provided as input via any mechanism for receiving the input.

Each data type 203(1) may be a data type designated by the client application 130(1) as corresponding to a data field for which at least one of the one or more input strings 204(1) is received as input. The server device(s) 102 may be configured to utilize the validation module 118 to determine whether each input string 204(1) conforms to the data type(s) 203(1) corresponding thereto, or in other words, whether each input string 204(1) is valid based on each data type 203(1) asserted by the client application 130(1) as corresponding thereto. In accordance with embodiments of the disclosure, any number of the input string(s) 204(1) may correspond to any number of the data type(s) 203(1). For example, each input string 204(1) may be validated against multiple data types 203(1). Similarly, multiple input strings 204(1) may correspond to a single data type 203(1) and may be validated against that data type. The data types 203(1)-203(N) may also be referred to herein as "asserted data types."

The data set 202(1) may further comprise one or more data type parameters 205(1) that may specify various criteria that the one or more input strings 204(1) should satisfy based on the one or more asserted data types 203(1). Exemplary criteria include, but are not limited to, a size limitation that each input string 204(1) is required to conform to, one or more encoding parameters, or one or more encryption parameters. The encoding parameter(s) may specify any of a variety of encoding schemes and/or character sets known to one of ordinary skill in the art or which may be developed in the future. For example, an encoding parameter may specify Universal Character Set (UCS) Transformation Format—8-bit (UTF-8) as a character set for Hypertext Markup Language/Uniform Resource Location (HTTP/URL) encoding in which certain characters are represented by substitute characters (e.g., ">" to represent ">"). The encoding parameter(s) may optionally specify any other common or arbitrary encoding scheme that may be represented as a data type parameter. The encryption parameter(s) may be specified in association with the encoding parameter(s) or independently thereof. The data type parameter(s) field 205(1) may optionally specify any number of parameters relating to the data type(s) 203(1) that may be utilized by the validation routine(s) during validation of the input string(s) 204(1) against corresponding data type(s) 203(1).

The data set 202(1) may further comprise one or more validation directives 206(1) that specify content requirements for the validation response (e.g., validation response 156(1)) that is generated by the server device(s) 102 upon execution of the one or more validation routines for the one or more input strings 204(1). The validation directive(s) 206(1) may specify particular content to be included in the validation response and may include, but are not limited to, one or more Boolean values indicating result(s) of the execution of the validation routine(s) for the input string(s) 204(1) (e.g., binary value(s) indicating whether the input string(s) 204(1) are valid or invalid based on corresponding asserted data type(s) 203(1)); at least one sanitized data string generated based on the result(s) of the execution of the validation routine(s) (e.g., at least one data string representing a modified version of at least one of the input string(s) 204(1) that conforms to the corresponding asserted data type(s) 203(1)); a data structure comprising one or more characters of one or more of the input string(s) 204(1) determined to be invalid by execution of the validation routine(s), one or more codes that identify one or more reasons that one or more of the input string(s) 204(1) were determined to be invalid by execution of the validation routine(s), or one or more recommendations for altering at least one data string to form at least one new data string that conforms to corresponding asserted data type(s) of the one or more data types 203(1). Any number of validation directive(s) 206(1) may be provided in the data set 202(1) for specifying requirements to which the validation response 156(1) must adhere.

At block 303 of the process flow depicted in FIG. 3, the one or more processors 120 of the server device(s) 102 may be configured to determine the one or more asserted data types 203(1) in the data set 202(1). In one or more embodiments, the processor(s) 120 may execute one or more computer program instructions forming at least part of the validation module(s) 118 to determine the asserted data type(s) 203(1). The processor(s) 120 may be configured to determine a respective key associated with each of the asserted data type(s) 203(1).

Upon determining the asserted data type(s) 203(1) (e.g., identifying a respective key associated with each asserted data type 203(1)), the processor(s) 120 may be configured to execute computer-executable instructions (which may form part of the validation module(s) 118) to control the DBMS(s) 114 to access the data type(s) datastore 146 to determine whether the asserted data type(s) 203(1) are stored in the datastore 146. The data type(s) datastore 146 may comprise one or more stored data types. The stored data type(s) may include data type(s) supported by standard web forms. The validation routine(s) datastore 148 may comprise one or more stored validation routines. Each validation routine stored in the datastore 148 may be associated with one or more of the data types stored in the datastore 146, or vice versa. In one or more embodiments, the data type(s) and the validation routine(s) may be stored in separate logical or physical datastores and may be linked or otherwise associated. In other embodiments, the data type(s) and validation routine(s) may be stored together in a same set of one or more datastores.

For each asserted data type 203(1) that corresponds to a data type stored in the datastore 146, corresponding validation routine(s) may be retrieved at block 304. At block 305, the processor(s) 120 may execute computer-executable instructions (which may form at least part of the validation module(s) 118) to perform the retrieved validation routine(s) on each of the input string(s) 204(1) that correspond to the asserted data type. Each validation routine may, according to one or more embodiments of the disclosure, comprise computer-executable instructions that may be executed by the processor(s) 120 using the validation module(s) 118. For example, in one or more specific embodiments of the disclosure, the validation module(s) 118 may comprise logic that makes a functional call for executing the validation routine(s).

Although the process flow of FIG. 3 has been described with respect to the data set 202(1), it should be understood that any of the validation requests 154(1)-156(N) may comprise one or more additional data sets 202(2)-202(N) (FIG. 2), which may, in turn, comprise one or more respective data types 202(2)-202(N), one or more input strings 204(2)-204(N), one or more data type parameters 205(2)-205(N), and one or more validation directives 206(2)-206(N), respectively. The validation module(s) 118 of the server device(s) 102 may comprise computer-executable instructions that upon execution by the processor(s) 102 causes corresponding validation routine(s) to be performed on each of the input string(s) 204(1)-204(N) with respect to corresponding asserted data types 203(1)-203(N), either serially or in parallel, or in any combination thereof.

According to one or more alternative embodiments of the disclosure, the client application(s) 130(1) may pre-register one or more web forms with the server device(s) 102. The pre-registered web form(s) may be stored, for example, in the datastore 144. A pre-registered web form may identify a respective one or more data types corresponding to each of one or more data fields in a web form. If a particular client application 130(1) has pre-registered a particular web form with the server device(s) 102, any validation request that includes input data from the pre-registered web form may not include the asserted data type(s) (e.g., 203(1)-203(N)), as the data type(s) may already be identified in the pre-registered web form. Further, any validation request that includes input data from a pre-registered web form may not include the data type parameter(s) and/or the validation directive(s) (e.g., 205(1)-205(N) and 206(1)-206(N), respectively), as these may be specified in the pre-registered web form as well. The one or more input strings (e.g., 204(1)-204(N)) included in any such validation request may be formatted or otherwise organized in such a manner so as to allow the server device(s) 102 to identify, from the corresponding pre-registered web form, the data type(s) to which each of the one or more input strings 204(1)-204(N) is required to conform as well as the respective corresponding data type parameter(s) 205(1)-205(N) and the respective corresponding directive(s) 206(1)-206(N).

One or more validation routines may be stored in association with the pre-registered web form. For example, the pre-registered web form may comprise a means for associating the validation routine(s) with the respective corresponding data type(s) of the pre-registered form. In one or more alternative embodiments, a pre-registered form stored, for example, in the datastore 144, may utilize or leverage stored data type(s) and corresponding validation routine(s) that are known to the server device(s) 102 such as, for example, data type(s) and/or validation routine(s) respectively stored in the datastores 146 and 148.

According to one or more alternative embodiments of the disclosure, none of the data type(s) 203(1)-203(N) included in the validation request 200 may correspond to a data type stored in the datastore 146. In certain embodiments in which pre-registration of client application(s) and/or associated web forms are required, an error or warning message indicating that the requested data type is not supported may be returned. In other embodiments, functionality for performing dynamic registration (or dynamic ad-hoc validation) may be provided such that the client application may specify, in association with the validation request(s) 154(1)-154(N), the appropriate validation routine(s) to be applied by the validation module(s) 118. For example, the validation directive(s) 206(1)-206(N) included in the data set(s) 202(1)-202(N) may specify the validation routines to be applied. Validation routine information may be specified in any number of ways for new data types that do not correspond to any stored data types. For example, one or more "pointers" or lookup keys may be provided within the validation request that point to or otherwise direct the validation module to one or more existing validation routines (stored for example in the datastore 148) to be executed with respect to the new data types. Alternatively, the validation request may include (as part of the validation directives for example) a script, program, function, or code fragment for performing the validation routine(s). Still further, any other mechanisms for dynamically registering the new data type or for processing the request on an ad-hoc basis without registering the new data type may be employed.

Referring again to FIG. 3 in the context of the representative data set 202(1) and the representative interaction between the client device 104(1) and the server device(s) 102, upon completion of the execution of the validation routine(s), the processor(s) 120 may be configured to utilize the validation response generation module(s) 152 to generate the validation response 156(1) at block 306. The validation response 156(1) may be generated only upon completion of the execution of the validation routine(s), or in other embodiments, portions of the validation response 156(1) may be generated concurrently with execution of the validation routine(s). Content included in the validation response 156(1) may be based, for example, on the validation directive(s) included in the data set 202(1). For example, the validation response 156(1) may include Boolean true values for those input string(s) 204(1) determined to conform to corresponding data types 203(1), thereby indicating validity of those input strings. Similarly, the validation response 156(1) may include Boolean false values for those input string(s) 204(1) determined not to conform to corresponding data types 203(1), thereby indicating invalidity of those non-conforming input string(s) 204(1). Further, as previously noted, for one or more non-conforming input string(s), the validation response 156(1) may include sanitized data string(s) representing modified version(s) of the non-conforming input string(s) that conform to the corresponding data type(s). The validation response 156(1) may further include a data structure comprising one or more non-conforming characters of at least one non-conforming input string, one or more codes that identify one or more reasons that one or more input strings are determined to be invalid or non-conforming, or one or more recommendations for altering one or more non-conforming input strings to form one or more conforming data strings that conform to corresponding data type(s).

The validation request 154(1) received from the client device 104(1) may comprise an identifier 201. The validation response 156(1) may comprise a same identifier that associates the validation response 156(1) with the corresponding validation request 154(1). In this manner, a validation request may be tracked and the appropriate validation response may be associated therewith. At block 307, the validation response 156(1) may be communicated or otherwise transmitted to the client device 104(1), or more specifically, the requesting client application 130(1) via a same connection over which the validation request 156(1) is received, or via any other available transport including a new connection or a previously established response channel.

According to one or more embodiments of the disclosure, the data type(s) datastore 146 and/or the validation routine(s) datastore 148 may be dynamically updated to include additional data type(s) and/or corresponding validation routine(s). The datastores 146, 148 may be updated without requiring re-installation or re-deployment of the validation services provided by the server device(s) 102 such as, for example, through the use of a software patch, a software download, a software update, or the like.

In other embodiments, registration of new data types and/or new validation routines and/or updating of existing data types and/or existing validation routines may occur by registration of new client applications that define new data types via a suitable automated or manual registration routine, by dynamic data type and validation routine registration as described earlier, or by any other reasonable method of populating the necessary registration data, including derivation or subsetting/supersetting of existing information within the datastores 144, 146, and 148, or any combination of the foregoing. However, as previously noted, in alternative embodiments, data validation may be performed on an ad-hoc basis based at least in part, for example, on validation directive(s) 206(1)-206(N) specified in the validation request 200.

Embodiments may be provided as a computer program product including a non-transitory machine-readable or computer-readable storage medium having stored thereon machine-executable or computer-executable instructions (in compressed or uncompressed form) that may be used to program a computer (or other electronic device) to perform processes or methods described herein. The machine may include any suitable processing or computing platform, device, or system and may be implemented using any suitable combination of hardware and/or software. The instructions may include any suitable type of code and may be implemented using any suitable programming language. In certain embodiments, machine-executable instructions for performing the methods and/or operations described herein may be embodied in software embodied in any of one or more higher-level programming languages capable of being compiled or interpreted, microcode, or firmware.

The machine-readable or computer-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions.

Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving, by one or more data validation computers comprising one or more processors, a validation request from a requestor to validate user input data, wherein the validation request comprises a data set, and wherein the data set comprises at least:
   one or more asserted data types and one or more data strings, wherein the one or more asserted data types correspond to a data field for which at least one of the one or more data strings is received as input, and
   one or more validation directives that specify one or more content requirements for a validation response;
   executing, by the one or more data validation computers, one or more validation routines to determine a validity of each of the one or more data strings based at least in part on at least one corresponding asserted data type of the one or more asserted data types;
   determining, by the one or more data validation computers, that each of the one or more data strings satisfy one or more data type parameters, wherein the one or more data type parameters specify one or more criteria based upon the one or more asserted data types;
   determining, by the one or more data validation computers, the one or more content requirements to be included in the validation response based at least upon the one or more validation directives, wherein the one or more validation directives comprises at least one or more codes that identify a reason that at least one data string of the one or more data strings is determined to be invalid by the execution of the one or more validation routines and one or more recommendations for altering the at least one data string to form at least one new data string that conforms to at least the one corresponding asserted data type;
   generating, by the one or more data validation computers and upon completion of the execution of the one or more validation routines, the validation response including at least the determined one or more contents requirements based on the execution of the one or more validation routines, wherein the validation response comprises a same identifier as the validation request, enabling the validation request to be tracked and associated with the appropriate validation response; and
   communicating, by the one or more data validation computers, the validation response to the requestor.

2. The method of claim 1, further comprising:
   identifying, by the one or more data validation computers, one or more stored data types, wherein each stored data type respectively corresponds to at least one of the one or more asserted data types; and
   identifying, by the one or more data validation computers, at least one validation routine of the one or more validation routines that respectively corresponds to each stored data type.

3. The method of claim 2, wherein each stored data type is stored in a first datastore comprising one or more stored data types and each validation routine is stored in a second datastore in association with the respective corresponding stored data type.

4. The method of claim 1, further comprising:
   identifying, by the one or more data validation computers, a registered web form among one or more stored web forms that corresponds to the validation request;
   identifying, by the one or more data validation computers, the one or more validation routines based on a correspondence between the one or more validation routines and the identified registered web form.

5. The method of claim 1, wherein the one or more data type parameters comprise at least one of: a size limitation for each of the one or more data strings, one or more encoding parameters, or one or more encryption parameters.

6. The method of claim 5, wherein the one or more validation directives comprise at least one of:
   one or more pointers to the one or more validation routines, or
   computer-executable instructions for executing the one or more validation routines.

7. The method of claim 1, wherein, based at least in part on the one or more validation directives, the validation response further comprises at least one of: at least one Boolean value indicating a result of the execution of the one or more validation routines for the one or more data strings, at least one sanitized data string generated based on the result of the execution of the one or more validation routines, or a data structure comprising one or more characters of a data string determined to be invalid by the execution of the one or more validation routines.

8. The method of claim 1, wherein the validation request comprises the one or more validation routines.

9. A data validation system comprising:
one or more computers, each computer comprising one or more processors and at least one memory operatively coupled to the one or more processors;
a validation module stored in the at least one memory of at least one of the one or more computers, the validation module comprising computer-executable instructions that upon execution by at least one processor of the one or more processors configures the at least one processor to:
receive a validation request from a requestor to validate user input data, wherein the validation request comprises a data set, and wherein the data set comprises at least:
one or more asserted data types and one or more data strings, wherein the one or more asserted data types correspond to a data field for which at least one of the one or more data strings is received as input, and
one or more validation directives that specify one or more content requirements for a validation response;
execute one or more validation routines to determine a validity of each of the one or more data strings based at least in part on at least one corresponding asserted data type of the one or more asserted data types;
determine that each of the one or more data strings satisfy one or more data type parameters, wherein the one or more data type parameters specify one or more criteria based upon the one or more asserted data types;
determine the one or more content requirements to be included in the validation response based at least upon the one or more validation directives, wherein the one or more validation directives comprises at least one or more codes that identify a reason that at least one data string of the one or more data strings is determined to be invalid by the execution of the one or more validation routines and one or more recommendations for altering the at least one data string to form at least one new data string that conforms to at least the one corresponding asserted data type;
generate the validation response upon completion of the execution of the one or more validation routines, the validation response including at least the determined one or more content requirements based at least in part on the execution of the one or more validation routines, wherein the validation response comprises a same identifier as the validation request, enabling the validation request to be tracked and associated with the appropriate validation response; and
communicate the validation response to the requestor.

10. The system of claim 9, further comprising:
one or more datastores comprising one or more stored data types and one or more stored validation routines,
wherein the validation module further comprises computer-executable instructions that upon execution by the at least one processor further configures the at least one processor to:
identify one or more stored data types, wherein each stored data type respectively corresponds to at least one data type of the one or more asserted data types; and
identify the one or more validation routines among the one or more stored validation routines by identifying at least one stored validation routine that respectively corresponds to each stored data type.

11. The system of claim 9, wherein the
one or more data type parameters comprise at least one of: a size limitation for each of the one or more data strings, one or more encoding parameters, or one or more encryption parameters.

12. The system of claim 9, wherein, based at least in part on the one or more validation directives, the validation response further comprises at least one of: at least one Boolean value indicating a result of the execution of the one or more validation routines for the one or more data strings, at least one sanitized data string generated based on the result of the execution of the one or more validation routines, or a data structure comprising one or more characters of a data string determined to be invalid by the execution of the one or more validation routines.

13. The system of claim 9, wherein the validation module further comprises computer-executable instructions that upon execution by the at least one processor further configures the at least one processor to:
identify a registered web form among one or more stored web forms that corresponds to the validation request;
identify the one or more validation routines based on a correspondence between the one or more validation routines and the identified registered web form.

14. The system of claim 9, wherein:
the validation request further comprises one or more additional data sets,
wherein each additional data set comprises a respective corresponding one or more asserted data types and a respective corresponding one or more data strings, and
the validation module further comprises computer-executable instructions that upon execution by the at least one processor further configures the at least one processor to:
execute one or more respective corresponding additional validation routines for each of the one or more data strings of each of the one or more additional data sets based at least in part on at least one corresponding asserted data type of the respective corresponding one or more asserted data types of each of the one or more additional data sets.

15. The system of claim 14, wherein the validation module further comprises computer-executable instructions that upon execution by the at least one processor further configures the at least one processor to:
execute the one or more validation routines for the one or more input strings of the data set and the respective corresponding additional validation routines for each of the one or more data strings of each of the one or more additional data sets serially or in parallel.

16. A non-transitory computer readable medium comprising computer program instructions that upon execution by one or more computer processors causes a method to be performed, the method comprising:
receiving a validation request from a requestor to validate user input data, wherein the validation request comprises a data set, and wherein the data set comprises at least:
one or more asserted data types and one or more data strings, wherein the one or more asserted data types correspond to a data field for which at least one of the one or more data strings is received as input, and
one or more validation directives that specify one or more content requirements for a validation response;

executing one or more validation routines to determine a validity each of the one or more data strings based at least in part on at least one corresponding asserted data type of the one or more asserted data types;

determining that each of the one or more data strings satisfy one or more data type parameters, wherein the one or more data type parameters specify one or more criteria based upon the one or more asserted data types;

determining the one or more content requirements to be included in the validation response based at least upon the one or more validation directives, wherein the one or more validation directives comprises at least one or more codes that identify a reason that at least one data string of the one or more data strings is determined to be invalid by the execution of the one or more validation routines and one or more recommendations for altering the at least one data string to form at least one new data string that conforms to at least the one corresponding asserted data type;

generating the validation response upon completion of the execution of the one or more validation routines, the validation response including at least the determined one or more content requirements based on the execution of the one or more validation routines, wherein the validation response comprises a same identifier as the validation request, enabling the validation request to be tracked and associated with the appropriate validation response; and communicating the validation response to the requestor.

17. The non-transitory computer readable medium of claim 16, the method further comprising:
identifying one or more stored data types, wherein each stored data type respectively corresponds to at least one data type of the one or more asserted data types; and
identifying at least one validation routine of the one or more validation routines that respectively corresponds to each stored data type.

18. The non-transitory computer readable medium of claim 17, wherein each stored data type is stored in a first datastore comprising one or more stored data types and each validation routine is stored in a second datastore in association with the respective corresponding stored data type.

19. The non-transitory computer readable medium of claim 16, the method further comprising:
identifying a registered web form among one or more stored web forms that corresponds to the validation request;
identifying the one or more validation routines based on a correspondence between the one or more validation routines and the identified registered web form.

* * * * *